United States Patent [19]
Hilton

[11] Patent Number: 5,853,474
[45] Date of Patent: Dec. 29, 1998

[54] USE OF STABILIZED EAFD AS A RAW MATERIAL IN THE PRODUCTION OF A PORTLAND CEMENT CLINKER

[75] Inventor: Robert G. Hilton, Knoxville, Tenn.

[73] Assignee: Conversion Systems, Inc., Horsham, Pa.

[21] Appl. No.: 869,286

[22] Filed: Jun. 2, 1997

[51] Int. Cl.$^6$ ............ C04B 18/06; C04B 18/08; C04B 18/14; C04B 7/36
[52] U.S. Cl. .......... 106/697; 106/745; 106/765; 106/769; 106/771; 588/256
[58] Field of Search ............ 106/697, 707, 106/745, 765, 769, 771, 798; 588/256

[56] References Cited

U.S. PATENT DOCUMENTS

| | | |
|---|---|---|
| 4,224,077 | 9/1980 | Olifer et al. . |
| 4,605,435 | 8/1986 | Duyvesteyn . |
| 4,756,761 | 7/1988 | Philip et al. . |
| 4,911,757 | 3/1990 | Lynn et al. . |
| 5,082,493 | 1/1992 | Barrett et al. . |
| 5,186,742 | 2/1993 | Hoffman et al. . |
| 5,245,122 | 9/1993 | Smith . |
| 5,278,111 | 1/1994 | Frame . |
| 5,338,336 | 8/1994 | Greenwalt . |
| 5,374,309 | 12/1994 | Piniecki . |
| 5,395,441 | 3/1995 | Bogdan et al. . |
| 5,421,880 | 6/1995 | Young . |
| 5,494,515 | 2/1996 | Young . |
| 5,538,532 | 7/1996 | Keegel, Jr. . |
| 5,557,031 | 9/1996 | Al-Sugair et al. . |
| 5,569,152 | 10/1996 | Smith . |
| 5,672,146 | 9/1997 | Aota ........................................ 588/256 |

*Primary Examiner*—Michael Marcheschi
*Attorney, Agent, or Firm*—Ratner & Prestia

[57] ABSTRACT

A method for producing portland cement includes adding stabilized electric arc furnace dust (EAFD) to the raw materials fed into the feed end of a rotary cement kiln to form a cement clinker. The untreated EAFD is preferably stabilized by forming a mixture of water, lime, and a cementitious reactant consisting of untreated electric arc furnace dust. Preferably, dolomitic lime is used and ferrous sulfate is added to the mixture. The stabilized EAFD, which is so soft that no grinding is necessary, may be nonetheless passed through the grinding mill along with the cement raw materials (excluding stabilized EAFD), combined with the raw materials after the raw materials are ground, or delivered directly to the rotary cement kiln in a stream separate from the cement raw materials. The stabilized EAFD serves as an inexpensive iron source in place of iron ore, mill scale, coal ash, or others. Preferably, the stabilized EAFD is added to the cement raw materials in an amount to provide an iron content of between 2%–5%, measured as iron oxide.

11 Claims, No Drawings

USE OF STABILIZED EAFD AS A RAW MATERIAL IN THE PRODUCTION OF A PORTLAND CEMENT CLINKER

FIELD OF THE INVENTION

The present invention pertains to the production of portland cement and, more specifically, to the raw materials added to a rotary kiln to form a cement clinker.

BACKGROUND OF THE INVENTION

In the production of portland cement, raw materials (such as limestone, clay, and sand) are ground, inter-blended, and fired in a rotary kiln at temperatures in the range of 2800° F. The constituents are selected to achieve a given ratio (depending upon the class of cement to be produced) of calcium, silica, alumina, and iron in the clinker (i.e., product derived from the kiln). In the production of portland cement, this clinker is inter-ground with gypsum to yield the final product. The overall quantity of iron required in portland cement production is typically from about two to five percent, measured as iron oxide. At many cement plants, the readily available raw materials do not contain sufficient iron to achieve the desired formulation; it is necessary to supplement the iron content, by the addition of iron ore, mill scale, coal ash, or other compatible iron sources.

Electric arc furnace dust (EAFD) is a by-product of electric arc furnace steelmaking. The material is designated hazardous by the U.S. Environmental Protection Agency EPA) and carries the designation of "KO61" because of the presence of leachable heavy metals (e.g., lead, chromium, cadmium, etc.). While there are approximately 750,000 tons of EAFD generated per year, little has been accomplished toward reuse, other than limited recycling of the dust back into electric arc furnaces from which it originated. EPA regulations mandate that the addition of a hazardous material to a product results in the designation of that product as hazardous. In addition, the transportation and handling of a hazardous material is more expensive than that of a non-hazardous material.

SUMMARY OF THE INVENTION

The present invention provides a method for producing a cement clinker comprising the steps of stabilizing untreated electric arc furnace dust to form stabilized electric arc furnace dust and adding cement raw materials and the stabilized electric arc furnace dust to cement kiln to produce the cement clinker. The present invention also provides a method for making portland cement by adding gypsum to a cement clinker of the present invention.

According to a preferred embodiment of the present invention, the step of stabilizing untreated electric arc furnace dust is accomplished by forming a mixture of water, lime, and a cementitious reactant consisting of untreated electric arc furnace dust. Preferably, the lime selected is dolomitic lime, and ferrous sulfate is also added to the mixture for stabilizing electric arc furnace dust.

According to another preferred embodiment of the present invention, the iron contents of the cement raw materials and of the stabilized electric arc furnace dust are determined. Based on these determinations, stabilized electric arc furnace dust is added in an amount to achieve an iron content in the mixture of the cement raw materials and stabilized electric arc furnace dust of from 2% to 5%, measured as iron oxide.

It is to be understood that both the foregoing general description and the following detailed description are exemplary, but are not restrictive, of the invention.

DETAILED DESCRIPTION OF THE INVENTION

The present invention is directed to a method for producing a cement clinker for portland cement production by first stabilizing untreated electric arc furnace dust (EAFD) to form stabilized EAFD, then adding the stabilized EAFD and cement raw materials to a feed end of a rotary cement kiln to produce the cement clinker. Portland cement is produced by then grinding and adding the ground gypsum to the cement clinker, which is the product derived from the kiln.

As used herein, the step of stabilizing untreated EAFD means converting the untreated EAFD, either physically and/or chemically, to a form having significantly reduced leachability of heavy metals, and specifically to a level which achieves the EPA's "generic exclusion" standard. The general exclusion" standard is met by a material which leaches heavy metals below the limits set forth in the Federal Register, Vol. 60, No. 113, Jun. 13, 1995, as discussed in the '152 patent. In this way, EAFD which was formerly deemed hazardous has been rendered non-hazardous after the stabilization step.

Preferably, the stabilization of untreated EAFD is accomplished by the methods described in U.S. Pat. Nos. 5,245, 122 and 5,569,152, both of which are incorporated herein by reference, except that the stabilized electric arc furnace dust is preferably not permitted to cementitiously harden by compaction (or otherwise), as described in the '122 patent.

As discussed in the '122 patent, EAFD is defined as the solid matter emitted from an electric arc furnace. These emissions occur during various phases of the operation of an electric arc furnace including:

(1) charging of scrap;

(2) tapping of furnaces;

(3) pneumatic injection of additives;

(4) oxygen blowing; and (5) meltdown/refining periods.

EAFD is the dust removed during any one of the above operations or a collection from any combination thereof. EAFD may be collected as a dry waste or wet, as a sludge. In its emitted form, EAFD readily leaches when wet, producing leachate concentrations which exceed the limits as set forth by the EPA. The EPA's Toxicity Characteristic Leaching Procedure (TCLP) described in Appendix II in 40 C.F.R. § 261 generally yields EAFD leachate concentrations for lead, cadmium and chromium which exceed the EPA maximum limits.

The '122 patent discloses a method for chemically stabilizing a hazardous waste composition containing EAFD by using the pozzolanic characteristics of EAFD. This method involves forming a mixture of EAFD with water and lime and, optionally, ferrous sulfate. The freshly blended product has acceptable leachate concentrations. The method disclosed in the '122 patent minimizes the concentration of certain heavy metals in the leachate from the freshly blended product. The '152 patent identifies dolomitic lime as the preferred lime in order to buffer the stabilized EAFD to a pH of between 8.5–11.5, and preferably 9.4 to 10.2, which reduces heavy metal ion solubility in water due to acid exposure.

In the present invention, it is particularly desirable to include ferrous sulfate as an additive in the stabilization of EAFD. During the stabilization of EAFD, ferrous sulfate serves to reduce chromium to its less soluble form, trivalent chromium, and serves to react with lead to form lead sulfate, which is relatively insoluble. Moreover, because the present invention envisions using the stabilized EAFD as an iron source in portland cement production, the addition of ferrous sulfate during the stabilization of EAFD would reduce the amount of stabilized EAFD which must be added to attain a particular iron concentration in the cement clinker.

Preferably, the EAFD used in the present invention has minimal variations in concentrations of the EAFD constituents from various samples of the EAFD. Preferably, the EAFD is selected from a single source.

The second general step of the invention is adding cement raw materials and the stabilized EAFD to a cement kiln to produce a cement clinker. The cement raw materials and stabilized EAFD may be added to a feed end of a cement kiln which is preferably a rotary cement kiln. The cement kiln may be wet or dry and in the form of any known conventional cement kiln. As used herein, the term "cement raw materials" include limestone, clay, and sand, and any other known cement raw materials including iron sources, such as iron ore, mill scale, and coal ash. Since stabilized EAFD is not heretofore known to be a raw material for cement clinker production, stabilized EAFD is not included in the term "cement raw materials," as used herein. In general, the cement raw materials include a number of constituents selected to achieve a given ratio (depending on the class of cement to be produced) of calcium, silica, alumina, and iron in the cement clinker.

The cement kiln is operated in a conventional manner, for example as described in U.S. Pat. Nos. 5,421,880 and 5,494,515 to Young. As described in these patents, cement raw materials are delivered to the feed end of the kiln, which is tipped downwardly at an angle such that the heat end of the kin is below the feed end. The cement raw materials are heated in the kiln. The kiln has several operating zones, which might include a precalcining zone, a calcining zone, a clinkering zone, and a cooling zone. In addition to the clinker withdrawn from the kiln, cement kiln dust is also withdrawn and treated as necessary. As mentioned in the '880 patent, chain systems or the like may be attached to the interior of the kiln to improve the efficiency of the heat exchanged between the gases and raw materials. The temperatures of the kiln are in the range of 2800° F., although this will vary depending on the particular class of cement to be produced and the composition of the cement raw materials and stabilized EAFD.

The order of mixing the stabilized EAFD with the cement raw materials is not important to the operation of the invention. For example, the stabilized EAFD and cement raw materials may be mixed prior to grinding and blending, for example, in a ball mill prior to the step of adding the mixture of the cement raw materials and stabilized EAFD to the cement kiln. In another embodiment of the invention, the cement raw materials are first ground and blended, then the stabilized EAFD, which typically has a soil-like consistency in the absence of any compaction, is blended with the ground and blended cement raw materials to form a raw material mixture. Subsequently the raw material mixture is then added to the cement kiln where it is heated. According to another alternative, the cement raw materials are first ground and blended then added to the cement kiln in a first stream, while the stabilized EAFD is added to the cement kiln in a second stream. In this way, the two streams are intermixed within the kiln.

As noted above, the EAFD which has been stabilized in accordance with the '122 and '152 patents has a soil-like consistency in the absence of any compaction. It is preferred that no compaction is made of this stabilized EAFD to avoid the formation of a cementitiously hardened product. If any compaction occurs, or if there is a significant hardening due to a lengthy time of cure or elevated temperatures along with compaction due to the presence of water in an optimal concentration, some grinding of the stabilized EAFD may be required. This grinding step of the stabilized EAFD is preferably avoided to minimize cost. Typically, unless some compaction is applied to the stabilized EAFD, the stabilized EAFD remains sufficiently soft so that no grinding is necessary for complete mixing of the stabilized EAFD with the cement raw materials to occur either in the kiln or prior to delivery to the kiln. In other words, the stabilized EAFD might have become agglomerated, but not cementitiously hardened to require grinding, unless some compactive force has been applied.

Generally, and again depending on the class of portland cement to be produced, the iron content of the mixture of the cement raw materials and stabilized EAFD should be between 2% and 5%, measured as iron oxide. This is accomplished by determining the iron content of the cement raw materials and determining the iron content of the stabilized EAFD, then adding a sufficient amount of EAFD to the cement raw material to achieve this percentage range. The steps can be carried out by know procedures, such as x-ray fluorescence spectrometry and wet chemical analyses, the latter of which is typically used as a check to determine the accuracy of the former.

EXAMPLES

The following examples are included to more clearly demonstrate the overall nature of the invention. These examples are exemplary, not restrictive, of the invention.

A sample of electric arc furnace dust (EAFD) was processed in accordance with the '122 and '152 patents. In particular, the EAFD was obtained from an eastern Pennsylvania steel mill and was mixed in the following weight percentages: 70% EAFD, 3% ferrous sulfate, 7% dolomitic monohydrated lime, and 20% water. The treated sample of EAFD was submitted for oxide analysis by x-ray fluorescence spectrometry and wet chemical analyses, the results of which are shown in Table 1. In particular, this chemical analysis of the sample indicates that greater than 50% is iron oxide, about 14% calcium oxide, and about 12% is zinc oxide on an ignited basis. The loss-on-ignition of the sample as received is nearly 26%.

This material was dried, then used as a substitute for iron ore in three Type II cement raw mixes; these were clinkered and evaluated. A computer program, based on the desired clinker composition, was used to design four raw mixes for cement manufacturing. One mix was a base case, and the other three mixes incorporated three levels of the treated EAFD replacing about ⅓, ⅔, and ⅗ of the iron ore in the base case mix design. After the clinkers were evaluated, they were ground with Terra Alba gypsum and plaster (calcium sulfate hemihydrate) to make cement. Cement pastes were mixed, tested for time of set, and 1 in. cubes were made and tested for compressive strengths at 1, 3, 7 and 28 days.

After preliminary evaluation of the cement paste results, several pounds of cement using the two higher substitution levels were made in a similar manner. These cements were submitted for tests included in ASTM C 150, Standard Specification for portland cement, to determine if the cements meet the specification for ASTM Type II portland cements. These cements were also submitted for U.S. EPA Toxicity Characteristic Leaching Procedure (TCLP) analysis for 14 elements.

TABLE 1

Combined SuperDetox Chemical Analysis [1]

| Analyte | Ignited SuperDetox Ignited basis[2] Weight % | Dried SuperDetox Corr w/LOI[2] Weight % | As received SuperDetox Corr w/L @ 105[2] Weight % |
|---|---|---|---|
| $SiO_2$ | 4.01 | 3.61 | 2.96 |
| $Al_2O_3$ | 0.93 | 0.84 | 0.69 |
| $Fe_2O_3$ | 50.16 | 45.24 | 37.10 |
| CaO | 14.11 | 12.72 | 10.43 |
| MgO | 5.13 | 4.62 | 3.79 |
| $SO_3$ | 2.12 | 1.91 | 1.57 |
| $Na_2O$ | 5.17 | 4.66 | 3.82 |
| $K_2O$ | 0.51 | 0.46 | 0.38 |
| $TiO_2$ | 0.09 | 0.08 | 0.06 |
| $P_2O_5$ | 0.22 | 0.20 | 0.16 |
| $Mn_2O_3$ | 3.19 | 2.88 | 2.36 |
| SrO | <0.01 | <0.01 | <0.01 |
| $Cr_2O_3$ | 0.39 | 0.35 | 0.29 |
| CuO | 0.23 | 0.21 | 0.17 |
| PbO | 1.38 | 1.24 | 1.02 |
| ZnO | 12.09 | 10.90 | 8.94 |
| LOI[3] | 0.00 | 9.79 | 8.03 |
| L @ 105[4] | 0.00 | 0.00 | 17.93 |
| TOTAL | 99.72 | 99.72 | 99.72 |

[1] Chromium oxide, lead oxide, and zinc oxide from AA analysis; copper oxide from special XRF trace metal scan; all remaining oxides from XRF analysis on an ignited basis.
[2] Column 1 are percentages on basis of material heated to 950° C. (ignited), column 2 adjusts the data including loss from 105° to 950° C., and column 3 adjusts for the loss on drying the as received material at 105° C.
[3] LOI is loss-on-ignition at 950° C. starting with material dried at 105° C.
[4] L @ 105 is the weight loss at 105° C. starting with the material as received. Total weight loss from material as received to ignited at 950° C. is 25.96%.

A raw mix design for a Type II cement was calculated using the program CTLRAWMIX, a linear regression computer program. The mix parameters in the program were chosen to be a lime saturation factor (LSF) of 93.5%, a silica modulus of 2.62, and an iron modulus of 1.28 for all four clinkers. Raw materials were a high quality limestone, clay, sand, iron ore, magnesium carbonate, and for three of the mixes, the dried and treated EAFD. The four clinkers (and cements) were designed EVS0, EVS1. EVS2. and EVS3 from the lowest to highest addition level. In order to obtain the four raw mix designs, the program was constrained to use 0, 2.14, 4.28, and 6.42% (on an ignited basis) of treated EAFD and a constant amount of magnesium carbonate, while the LSF, silica, and iron moduli were kept constant. The resulting calculated potential compound contents were about 60% $C_3S$, 18% $C_2S$, 6% $C_3A$, and 11% $C_4AF$.

The raw materials were all reduced to approximately 30 mesh or finer and then the proportions weighed. The mixes were then ground in a ceramic ball mill until greater than 99% passed through a No. 200 mesh sieve. Pressed pellets 2.25 inches in diameter and about 150 g each were made from each mix and then put into platinum dishes and clinkered in an electric furnace. The clinkering was done in a simulated kiln atmosphere of 77.6% $N_2$, 1.6% $O_2$, 18.4% $CO_2$, and 2.4% $H_2O$. Temperature was carefully controlled to give the following profile: temperature increasing 20° C. per minute from 950° C. to 1430° C. and the temperature held at 1430° C. for 30 minutes. The clinkered pellets were then promptly removed from the furnace and air cooled.

Small samples of clinker were taken for microscopical analysis of polished sections and oxide analyses by XRF. The oxide analyses appear in Table 2.

TABLE 2

REPORT OF CHEMICAL ANALYSIS

| Client's Sample ID: | EVS0 | EVS1 | EVS2 | EVS3 |
|---|---|---|---|---|
| Material type: | Clinker | Clinker | Clinker | Clinker |
| CTL Sample ID: | 920192 | 920193 | 920194 | 920195 |
| Analyte | Weight % | Weight % | Weight % | Weight % |
| $SiO_2$ | 22.50 | 22.19 | 22.08 | 21.94 |
| $Al_2O_3$ | 4.70 | 4.69 | 4.63 | 4.59 |
| $Fe_2O_3$ | 3.80 | 3.80 | 3.74 | 3.75 |
| CaO | 65.89 | 65.49 | 65.29 | 64.90 |
| MgO | 2.39 | 2.51 | 2.59 | 2.71 |
| $SO_3$ | 0.03 | 0.06 | 0.04 | 0.09 |
| $Na_2O$ | 0.08 | 0.18 | 0.30 | 0.44 |
| $K_2O$ | 0.23 | 0.25 | 0.25 | 0.22 |
| $TiO_2$ | 0.32 | 0.32 | 0.32 | 0.32 |
| $P_2O_5$ | 0.04 | 0.04 | 0.05 | 0.05 |
| $Mn_2O_3$ | 0.06 | 0.12 | 0.18 | 0.24 |
| SrO | 0.03 | 0.03 | 0.03 | 0.03 |
| L.O.I. (950° C.) | 0.09 | 0.01 | 0.05 | 0.00 |
| Total | 100.14 | 99.69 | 99.55 | 99.27 |
| Alkalies as $Na_2O$ | 0.23 | 0.35 | 0.47 | 0.58 |
| Insoluble Residue | | | | |
| Free CaO | | | | |
| Calculated Compounds per ASTM C 150-92 | | | | |
| C3S | 58 | 58 | 59 | 59 |
| C2S | 21 | 20 | 19 | 19 |
| C3A | 7 | 7 | 7 | 7 |
| C4AF | 12 | 12 | 11 | 11 |
| ss(C4AF + C2F) | — | — | — | — |

Notes:
1. This analysis represents specifically the sample submitted.
2. Oxide analysis by X-ray fluorescence spectrometry. Samples fused at 1000° C. with $Li_2B_4O_7$.
3. Values for $TiO_2$ and $P_2O_5$ are added to the $Al_2O_3$ when the compounds are calculated, in accordance with ASTM C 150.
4. X-Ray Fluorescence oxide analysis meets the precision and accuracy requirements for rapid methods per ASTM C 114-88. Most recent re-qualification date is May 30, 1995.

Evaluation of the clinkers by microscopy is contained in "Microscopic Analyses of Clinker Polished Sections" and they appear in this report after the tables. The quality of all four clinkers is good and few differences were noted. Trends that were observed with the increasing addition levels include an increasing amount of dendritic periclase and dendritic belite and decreasing amounts of free lime. Overall the differences were slight, but these characteristics were noticeable in clinkers EVS2 and EVS3 which had the highest EAFD acts as a flux, permitting lower clinkering temperatures at higher addition levels. Fused alite and certain other characteristics are probably due to the large pellets and conditions typical of static electric furnace burns. The differences between the four clinkers are quite small and do not indicate large changes in clinker quality with the level of addition.

Each remaining clinker was ground in several steps. The amount of calcium sulfate added was calculated to obtain a 0.68 molar ration of total $SO_3$ to $Al_2O_3$ in the finished cement. Due to decreasing alumina in the clinkers, equivalent gypsum addition varied from 5.38% to 5.11%, and the estimated cement $SO_3$ level was about 2.40% for all four cements. Actual addition used one-half the required gypsum and the other half was converted to calcium sulfate hemihydrate (plaster). Terra Alba gypsum and plaster made from it was added to EVS0, EVS1, EVS2, and EVS3. This gypsum equivalent was added to the partially ground clinkers. Then, the clinker and gypsum were interground in a ceramic ball mill until they all had a Blaine fineness of 3700±60 $cm^2/g$. The larger batches of EVS2 and EVS3, designed EV2L and EV3L, were prepared in an identical manner, except the finish grinding of the cements was done in a steel ball mill with charge weight of about 3.5 kg.

Cement paste was made a Hamilton-Beach mixer at a water to cement (w/c) ratio of 0.48 for all four cements using a two minute mix, three minute rest, two minute mix mixing schedule. A modified Vicat test was used to measure time of set, and twelve 1 in. cubes were cast for compressive strength tests. The cubes were cured at 23° C. and 100% relative humidity until tested; the cubes were in the molds only for the first 23 hours.

Cement paste tests indicated similar setting times below 4.3% substitution and a slight decrease at the highest substitution level. Compressive strengths at 1, 3, and 7 days increase with additions of up to 4.28% of treated EAFD, but at 28 days strengths are comparable for the same addition range. Compressive strength development at the highest addition level versus the base case is more rapid at 1 day and slower at later ages. Cement EVS3 compared to EVS0 is slightly stronger at one day, comparable at 3 and 7 days, and somewhat weaker at 28 days. These results are shown in Table 3.

TABLE 3

|  | EVS0 | EVS1 | EVS2 | EVS3 |
|---|---|---|---|---|
| Cement Paste (w/c = 0.48) and Cement Test Results | | | | |
| Cement ID | | | | |
| SuperDetox in clinker (ignited basis) | 0% | 2.14% | 4.28% | 6.42% |
| Percent Iron Ore replaced | 0% | 33.4% | 66.8% | 100.0% |
| Blaine Surface Area | 3650 | 3760 | 3750 | 3660 cm$^2$/g |
| Time of Set by modified Vicat method | 5 hrs 38 min. | 5 hrs 51 min. | 5 hrs 28 min. | 5 hrs 13 min. |
| Average Compressive Strengths of 1" Paste Cubes | | | | |
| One Day | 1270 | 1470 | 1600 | 1530 p.s.i. |
| Three Day | 4200 | 4270 | 4370 | 4100 p.s.i. |
| Seven Day | 5900 | 6630 | 6850 | 5800 p.s.i. |
| Twenty-eight Day | 11,430 | 11,470 | 11,330 | 10,430 p.s.i. |

ASTM testing of EV2L and EV3L (larger cement batches with the same mix design as EVS2 and EVS3) indicates both meet the specification of Type II portland cement. In fact, cement samples EV2L and EV3L meet the standard chemical and physical requirements of ASTM C 150-95 for Type I and Type II portland cements. Additionally, both samples meet the optional 28-day compressive strength of mortar and optional alkali content requirements of ASTM C 150-95 for Type I and Type II portland cements. Compressive strengths of these mortar cubes indicate the same trend as observed for the paste specimens. At all four ages, the compressive strengths for EV3L made with 6.24% stabilized EAFD are slightly less than for EV2L made with 4.28%. The strength differences between mortar cubes for these two cements at the same ages is considerably smaller than between comparable paste cubes strengths Cements EV2L and EV3L were also submitted for U.S. EPA TCLP analysis and the leachates analyzed for the eight toxicity characteristic elements and, in addition, for the following six elements: antimony, beryllium, nickel, thallium, vanadium, and zinc. Except for the chromium leachate concentration, all other leachate concentrations are 1/100 or less of the maximum acceptable concentrations for RCRA toxicity characteristics or cite-specific regulatory limitations, where applicable. Leachate concentrations for chromium are low, but not as low as they are for the other elements. Chromium TCLP levels were 1.9 and 1.1 mg/L for cements EV2L and EV3L. Assuming a small chromium content in the other raw materials plus that in the treated EAFD, it is estimated that EV2L and EV3L contain 140 and 210 mg/Kg chromium, respectively. It has been reported that cements with chromium contents between these limits have TCLP chromium leachate concentrations between 0.5 and 1.6 mg/L. The cement clinkering process is done at high temperature in an oxidizing atmosphere; therefore, it is not surprising that a small amount of chromium may be oxidized to the higher valence and more leachable form. A complete report of the TCLP results for the two cements appears as Table 4.

TABLE 4

Report of Chemical Analysis

| Client's Sample ID: | | EV2L | EV3L |
|---|---|---|---|
| Material Type: | | Cement | Cement |
| CTL's Sample ID: | | 921836 | 921837 |
| Analyte | RCRA TCLP max. conc. (mg/L) | TCLP Result (mg/L) | TCLP Result (mg/L) |
| Antimony (Sb) | 1 | 0.003 | <0.006 |
| Arsenic (As) | 5 | 0.01 | 0.03 |
| Barium (Ba) | 100 | 0.7 | 0.8 |
| Beryllium (Be) | 0.007 | <0.0004 | <0.00001 |
| Cadmium (Cd) | 1 | <0.008 | <0.008 |
| Chromium (Cr) | 5 | 1.9 | 1.1 |
| Lead (Pb) | 5 | <0.05 | <0.05 |
| Mercury (Hg) | 0.2 | <0.0001 | <0.0001 |
| Nickel (Ni) | 70 | <0.03 | <0.03 |
| Selenium (Se) | 1 | 0.03 | 0.03 |
| Silver (Ag) | 5 | 0.06 | 0.06 |
| Thallium (Tl) | 7 | <0.06 | <0.01 |
| Vanadium (V) | — | 0.3 | 0.3 |
| Zinc (Zn) | — | 0.03 | 0.05 |
| pH of TCLP Extract | | 12.88 | 12.88 |

Notes:
1. These analyses represent specifically the samples submitted.
2. This report may not be reproduced except in its entirety.
3. Extraction and testing were performed in accordance with EPA SW-846.

In general, the test results show that treated EAFD is an acceptable alternative iron source in the production of a clinker for portland cement. The quality of the clinker was quite good at all levels of usage. Changes in the cement setting times were minor and the compressive strengths below 4.3% addition were greater than the control while those above were not much less than the control.

Although illustrated and described herein with reference to certain specific embodiments and examples, the present invention is nevertheless not intended to be limited to the details shown. Rather, the claims should be read to include various modifications within the scope and range of equivalents of the claims, without departing from the spirit of the invention.

What is claimed is:

1. A method for producing a cement clinker, said method comprising the steps of:
   stabilizing untreated electric arc furnace dust to form stabilized electric arc furnace dust; and
   adding cement raw materials and said stabilized electric arc furnace dust to a cement kiln to produce said cement clinker.

2. The method in accordance with claim 1, wherein the step of stabilizing said untreated electric arc furnace dust comprises the step of forming a mixture of water, lime, and a cementitious reactant consisting of said untreated electric arc furnace dust.

3. The method in accordance with claim 2, wherein said lime comprises dolomitic lime.

4. The method in accordance with claim 2, wherein the step of forming a mixture includes adding ferrous sulfate to said mixture.

5. The method in accordance with claim 1, wherein said cement raw materials include limestone, clay, and sand.

6. The method in accordance with claim 1 further comprising grinding and blending said cement raw materials and said stabilized electric arc furnace dust prior to the step of adding said cement raw materials and said stabilized electric arc furnace dust to said cement kiln.

7. The method in accordance with claim 1, wherein the step of adding said cement raw materials includes:

grinding and blending said cement raw materials;

blending said stabilized electric arc furnace dust with said ground and blended cement raw materials to form a raw material mixture; and adding said raw material mixture to said cement kiln.

8. The method in accordance with claim 1, wherein the step of adding said cement raw materials includes:

grinding and blending said cement raw materials;

adding said ground and blended cement raw materials to said cement kiln in a first stream; and adding said stabilized electric arc furnace dust to said cement kiln in a second stream.

9. The method in accordance with claim 1 further comprising determining the iron content of said cement raw materials and determining the iron content of said stabilized electric arc furnace dust, wherein said stabilized electric arc furnace dust is added in an amount to achieve an iron content in the mixture of said cement raw materials and said stabilized electric arc furnace dust of 2% to 5%, measured as iron oxide.

10. A method for producing a cement clinker, said method comprising the steps of:

stabilizing untreated electric arc furnace dust by forming a mixture of water, lime and a cementitious reactant consisting of said untreated electric arc furnace dust to form a stabilized electric arc furnace dust product, which is sufficiently soft so that no grinding is required; and adding cement raw materials and said stabilized electric arc furnace dust product to a feed end of a rotary cement kiln to produce a cement clinker.

11. A method for producing portland cement, said method comprising the steps of:

stabilizing untreated electric arc furnace dust by forming a mixture of water, lime and a cementitious reactant consisting of said untreated electric arc furnace dust to form a stabilized electric arc furnace dust product;

adding cement raw materials and said stabilized electric arc furnace dust product to a feed end of a rotary cement kiln to produce a cement clinker; and adding gypsum to said cement clinker to form portland cement.

* * * * *